United States Patent
Yu et al.

(10) Patent No.: US 9,326,315 B2
(45) Date of Patent: Apr. 26, 2016

(54) AREA-LIMITED SELF-ORGANIZED NETWORK MANAGEMENT METHOD, COMMUNICATIONS APPARATUS, AND SYSTEM

(71) Applicants: Haihua Yu, Beijing (CN); Wei Wang, Beijing (CN); Yan Sun, Beijing (CN); Bin Da, Beijing (CN); Yindong Zhang, Beijing (CN)

(72) Inventors: Haihua Yu, Beijing (CN); Wei Wang, Beijing (CN); Yan Sun, Beijing (CN); Bin Da, Beijing (CN); Yindong Zhang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 198 days.

(21) Appl. No.: 14/070,965

(22) Filed: Nov. 4, 2013

(65) Prior Publication Data

US 2014/0126416 A1    May 8, 2014

(30) Foreign Application Priority Data

Nov. 7, 2012    (CN) .......................... 2012 1 0441507

(51) Int. Cl.
| | |
|---|---|
| *H04W 4/00* | (2009.01) |
| *H04L 12/28* | (2006.01) |
| *H04B 7/00* | (2006.01) |
| *H04W 84/20* | (2009.01) |
| *H04W 4/02* | (2009.01) |
| *H04W 12/04* | (2009.01) |
| *H04L 29/06* | (2006.01) |
| *H04W 12/06* | (2009.01) |

(52) U.S. Cl.
CPC .............. *H04W 84/20* (2013.01); *H04W 4/021* (2013.01); *H04W 12/04* (2013.01); *H04L 63/107* (2013.01); *H04W 12/06* (2013.01)

(58) Field of Classification Search
CPC ..... H04W 84/20; H04L 45/02; H04L 45/123; H04L 9/0833
See application file for complete search history.

(56) References Cited

U.S. PATENT DOCUMENTS

| | | | | |
|---|---|---|---|---|
| 5,822,309 A | * | 10/1998 | Ayanoglu et al. | 370/315 |
| 6,842,460 B1 | * | 1/2005 | Olkkonen et al. | 370/465 |
| 6,954,436 B1 | * | 10/2005 | Yip et al. | 370/254 |
| 2002/0055978 A1 | * | 5/2002 | Joon-Bo et al. | 709/209 |
| 2002/0159401 A1 | * | 10/2002 | Boger | 370/294 |
| 2003/0076842 A1 | * | 4/2003 | Johansson et al. | 370/401 |

(Continued)

FOREIGN PATENT DOCUMENTS

| | | |
|---|---|---|
| EP | 1744505 A1 | 1/2007 |
| JP | 2013-021499 A | 1/2013 |
| WO | WO 2013/008939 A1 | 1/2013 |

*Primary Examiner* — Melanie Jagannathan
(74) *Attorney, Agent, or Firm* — Oblon, McClelland, Maier & Neustadt, L.L.P.

(57) ABSTRACT

Disclosed are an area-limited self-organized wireless network management method, a communication apparatus, and a system. The method comprises a step of, when a communications apparatus which is entering the limited area receives area signals for indicating a specific area in which network nodes are located, determining by the communications apparatus whether the master node exists in the limited area; a step of, if it is determined that the master node exists, performing identity authentication with regard to the master node and letting the communications apparatus itself be a sub node by the communications apparatus; and a step of, if it is determined that the master node does not exist, letting the communications apparatus itself be the master node by the communications apparatus, wherein, the master node is in charge of entering of a new sub node and synchronization of shared secret keys between the network nodes.

9 Claims, 10 Drawing Sheets

(56) References Cited

U.S. PATENT DOCUMENTS

| | | | |
|---|---|---|---|
| 2004/0114538 A1* | 6/2004 | Bouet | 370/254 |
| 2005/0111668 A1* | 5/2005 | Raikar | 380/278 |
| 2005/0141706 A1* | 6/2005 | Regli et al. | 380/44 |
| 2005/0152305 A1* | 7/2005 | Ji et al. | 370/328 |
| 2005/0180343 A1* | 8/2005 | Van Valkenburg | 370/310 |
| 2005/0262216 A1* | 11/2005 | Kashiwabara et al. | 709/208 |
| 2006/0052125 A1* | 3/2006 | Falck et al. | 455/517 |
| 2006/0106963 A1* | 5/2006 | Sasaki et al. | 710/110 |
| 2007/0053351 A1 | 3/2007 | Kalogridis | |
| 2007/0055877 A1* | 3/2007 | Persson et al. | 713/171 |
| 2007/0253345 A1* | 11/2007 | Habetha et al. | 370/254 |
| 2012/0238216 A1* | 9/2012 | Hallowell et al. | 455/41.3 |

* cited by examiner

AREA-LIMITED SELF-ORGANIZED NETWORK MANAGEMENT METHOD, COMMUNICATIONS APPARATUS, AND SYSTEM

BACKGROUND OF THE INVENTION

1. Field of the Invention

The present invention generally relates to a self-organized wireless network, and more particularly relates to an area-limited self-organized wireless network management method, a communication apparatus, and a system.

2. Description of the Related Art

A self-organized network, i.e., the well-known Ad-hoc network in the field of this invention is a kind of wireless network which is different from the conventional wireless networks. It does not depend on any fixed infrastructure and management center, but it is temporarily established by a group of self-organized mobile nodes (for example, notebook computers, personal digital assistants, etc.). According to the mutual cooperation and self-organization of the mobile nodes, network connection is maintained, and data transfer is accomplished.

Regarding the self-organized network, technologies such as network session management and network organization have been developed so far.

For example, in U.S. Pat. No. 6,842,460B1 titled "Ad Hoc Network Discovery Menu" and a patent reference No. EP1744505A1 titled "Wireless Ad-hoc Network Formation", a method of adding a network node in an existing self-organized network session is disclosed.

Furthermore, in U.S. Patent Application No. 2002/0159401A1 titled "Masterless Slave/Master Role Switch in a Bluetooth Piconet", a method of how a master/slave network selects a candidate master node is disclosed.

SUMMARY OF THE INVENTION

In a conventional Ad-hoc network, there is not a predefined (for example, manually defined) boundary for limiting an area, and the area is usually limited (defined) by the maximum transmission distance of the Ad-hoc network.

From a viewpoint of considering communications security, secrecy, speed, and the like, at present, Ricoh Co., Ltd. has made some studies on an area-limited Ad-hoc network, and has proposed achieving area limitation by using, for example, infrared rays (IR), Near Field Communications (NFC), ultrasonic waves, microwaves, or the like. Since an area-limited Ad-hoc network has a predetermined (predefined) boundary, compared to the conventional Ad-hoc network, a mobile node may enter or exit from the area, and communications may be carried out between mobile nodes only located in the same area.

According to one aspect of the present invention, a network management method of an area-limited self-organized wireless network is provided. Only nodes located in the limited area may communicate with each other. The nodes in the self-organized wireless network include a master node (or called a "main node") and at least one sub node, and there is only one master node in the same limited area. The network management method comprises a step of, when a communications apparatus which is entering the limited area receives area limiting signals used for indicating (defining) a specific area in which network nodes are located, determining by the communications apparatus whether the master node exists in the limited area; a step of, if it is determined that the master node exists, carrying out identity authentication with regard to the master node based on the area limiting signals and letting the communications apparatus itself be a sub node by the communications apparatus; and a step of, if it is determined that the master node does not exist, letting the communications apparatus itself be the master node by the communications apparatus. Here the master node is in charge of the entering of a new sub node and the synchronization of shared secret keys between the network nodes.

According to another aspect of the present invention, a communications apparatus is provided. The communications apparatus comprises an area limiting signal receiving part configured to receive area limiting signals for limiting an area; a surrounding node detecting part configured to, when the communications apparatus which is entering the limited area receives the area limiting signals, determine whether a master node exists in the limited area; and role switching part configured to, if it is determined that the master node exists, carry out identity authentication with regard to the master node based on the area limiting signals and let the communications apparatus itself be a sub node, and if it is determined that the master node does not exist, let the communications apparatus itself be the master node. Here the master node is in charge of the entering of a new sub nod and the synchronization of shared secret keys between network nodes.

According to still another aspect of the present invention, an area-limited wireless communications system is provided. The area-limited wireless communications system comprises area limiting signal transmitting apparatuses configured to send area limiting signals for limiting an area; and plural wireless communications apparatuses dynamically located in the limited area. Here one of the plural wireless communications apparatuses is a master node, and the others serve as sub nodes. Additionally, the master node is in charge of the entering of a new sub node and the synchronization of shared secret keys between network nodes. When the master node disappears, one of the sub nodes automatically becomes a new mater node. When there is only one wireless communications apparatus in the area-limited wireless communications system, this wireless communications apparatus becomes a master node. After that, when a new wireless communications apparatus enters, this new wireless communications apparatus becomes a sub node. Each sub node has a priority assigned by a master node, and the priority is used for indicating a priority level of this sub node becoming a new master node. A communications apparatus serving as a sub node periodically detects the state of a master node. If this sub node does not detect the master node in a predetermined time period, and the priority of this sub node is higher than those of other sub nodes, then this sub node automatically becomes a new master node, and informs the other sub nodes that the master node has changed. The master node periodically detects the states of the respective sub nodes. If the master node does not detect a sub node in a predetermined time period, then the master node regards this sub node as having disappeared, changes a shared secret key, and informs other sub nodes of the changed shared secret keys and information indicating that this sub node has disappeared.

By utilizing the network management method of the area-limited self-organized network, the communications apparatus, and the system, it is possible to provide a session management mechanism of a wireless self-organized network in a limited area, and to enhance a safety authentication mechanism of an area-limited wireless network connection.

In addition, by utilizing the network management method of the area-limited self-organized network, the communications apparatus, and the system, it is also possible to ensure the coincidence of network topology structures and network session states between any two of all session member nodes, and since there is not any manual operation in the whole process, it is possible to decrease the complexity of user operation.

DETAILED DESCRIPTION OF THE PREFERRED EMBODIMENTS

Hereinafter, embodiments of the present invention will be concretely described with reference to the drawings. However, it should be noted that the same symbols, which are in the specification and the drawings, stand for constructional elements having the basically-same function and structure, and repeated explanations for the constructional elements are omitted.

In order to let those people skilled in the art better understand the present invention, in what follows, the present invention is concretely illustrated by referring to the drawings and the specific embodiments according to the following order.

1. Definition of Basic Terms
2. Exemplary Structure of Area-Limited Self-Organized Network
3. Network Management Method
3.1 Overview of Network Management Method
3.2 Protocol State Machine of Network Session Management
3.3 Creation of Network Session
3.4 Entering of New Sub node
3.5 Sub Node Exiting from Session
3.6 Master Node Exiting from Session
3.7 Solution of Master Node Collision
4. Communications Apparatus
5. Area-limited Wireless Communications System
6. Conclusion
1. Definition of Basic Terms Prior to concretely illustrating the respective embodiments, first a few terms related to the present invention are defined as follows.

An "area-limited self-organized network" is a self-organized network in which only nodes located in a limited area are able to communicate with each other.

A "session" in this specification is a logical concept corresponding to a self-organized network established by all of network nodes in a current limited area. As for a limited area, a network session is automatically created by a node first entering this area (this node automatically becomes a master node), and when a last node exits, the session is automatically destroyed. Here it should be noted that a conventional "session" generally relates to a continuous and non-interrupted operation time period of two specific objects; however, the concept of the "session" in the present invention is different from that of the conventional session.

A "session state" in this specification may generally be understood as a current network state. The current network state includes, for example, a current valid shared secret key, a current active node list, or an attribute (for example, a network address, an application extending attribute, etc.) of each active node.

2. Exemplary Structure of Area-Limited Self-Organized Network

Figure 1:
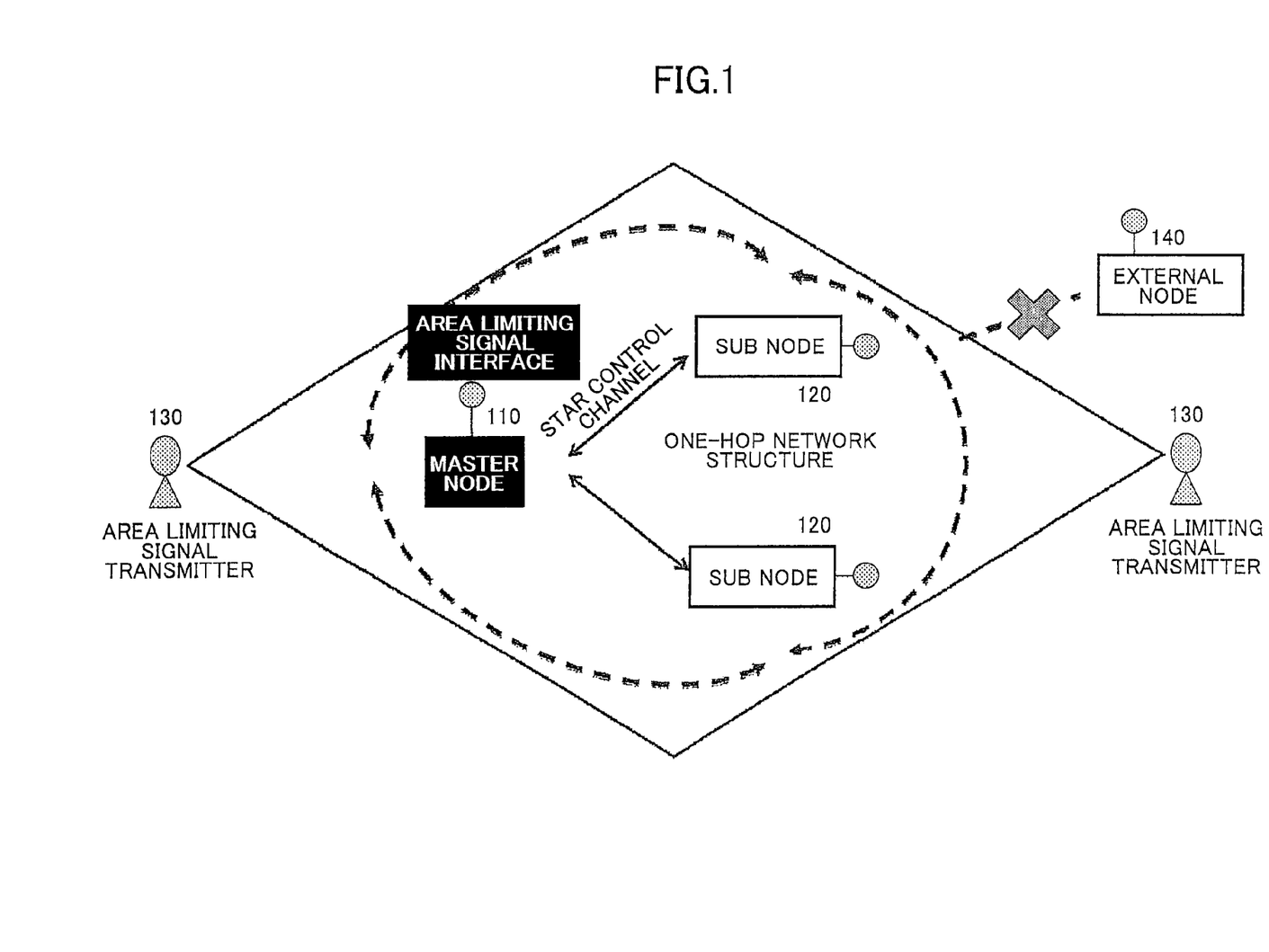
FIG. 1 illustrates an exemplary structure of an area-limited self-organized network.

FIG. 1 illustrates an exemplary structure of an area-limited self-organized network.

As shown in FIG. 1, a limited area is defined by dotted lines with arrows. Only communications apparatuses located in this area, for example, a master node 110 and two sub nodes 120 can communicate with each other (i.e., they are in a network session), but an external node 140 cannot enter the network session. The limited area may be achieved (defined) by the area limiting signals (sometime called "area signals") transmitted by two area limiting signal transmitters 130. Each node able to enter the area-limited self-organized network session, for example, the master node 110 or any one of the sub nodes 120, has an area signal interface used for receiving the area signals transmitted by the area limiting signal transmitters 130. The logical topology structure of this network is a star structure. In addition, the detection and synchronization of the network session states may be achieved by carrying out periodic polling between the master node and any one of the sub nodes 120.

In this example, the topology structure of the network is a one-hop structure.

However, it should be noted that the one-hop structure is just an example; that is to say, a multi-hop topology structure may be applied to the present invention too.

According to an example, a master node may be in charge of the entering of a new sub node and the synchronization of session states between network nodes. However, the master node is not involved in the data transfer between the network nodes. For example, in a case of a multi-hop topology network, a master node cannot serve as a relay node for forwarding information.

3. Network Management Method
3.1 Overview of Network Management Method

Figure 2:
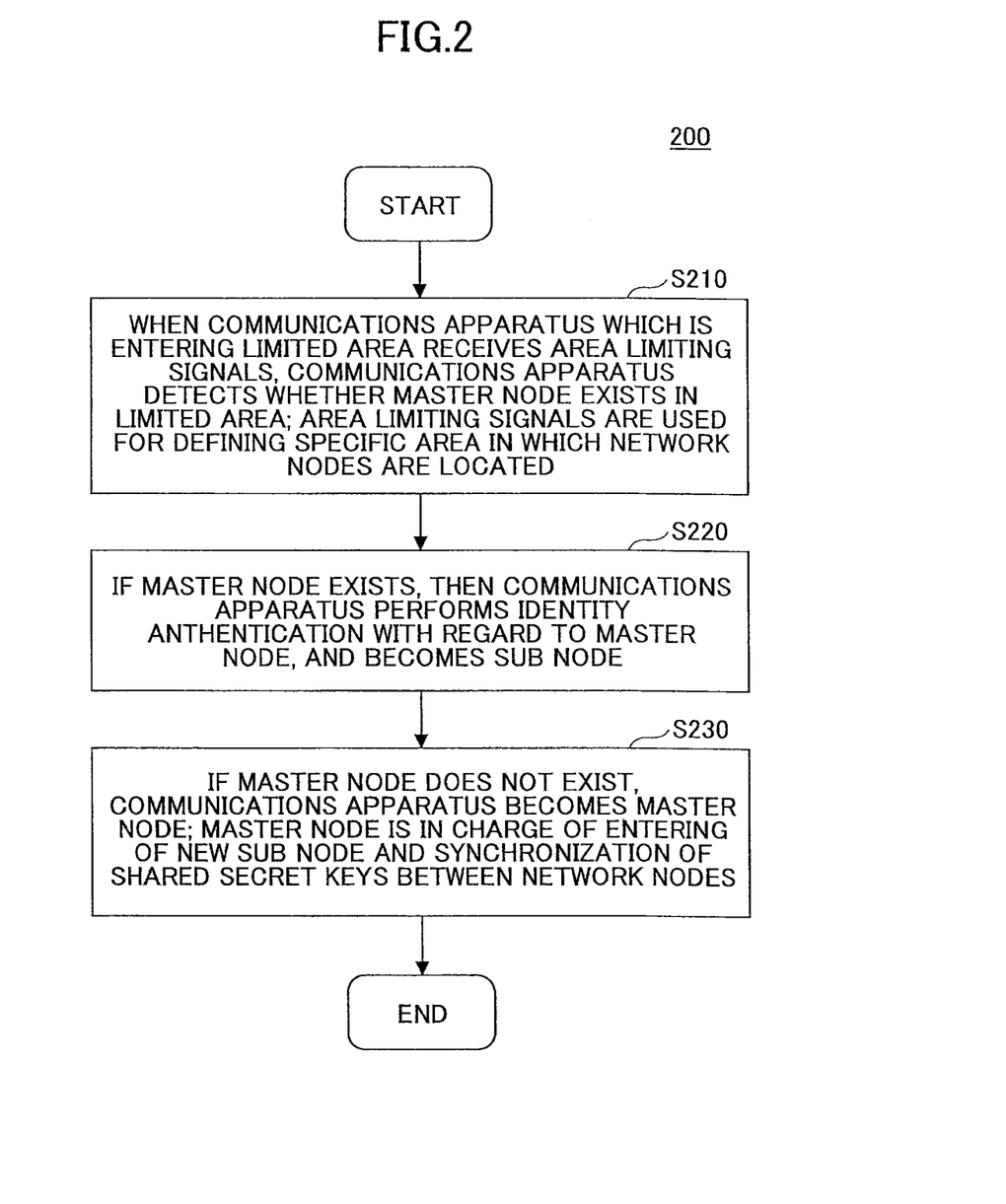
FIG. 2 is a flowchart of a network management method of an area-limited self-organized network according to an embodiment of the present invention.

FIG. 2 is a flowchart of a network management method 200 of an area-limited self-organized network according to an embodiment of the present invention.

Here nodes only located in a limited area can communicate with each other. The nodes in the self-organized network include a master node or at least one sub node, and there is only one master node in the same limited area. It should be noted that a master node and a sub node in the present invention are logical concepts, and they are dynamic, i.e., their roles may be switched. For example, a communications apparatus may not be a master node at first, but it becomes the master node later. Alternatively, a communications apparatus may be a master node at first, but it becomes a sub node later. Furthermore, in the follow-on process, a role may also be switched between a master node and a sub node on the basis of the overall circumstance of the network nodes.

In STEP S210, when a communications apparatus which is entering a limited area receives area limiting signals, the communications apparatus determines (detects) whether a master node exists in the limited area; the area limiting signals are used for indicating (defining) a specific area in which network nodes are located. As for an area-limited self-organized network, area limiting signal transmitting apparatuses, for example, the area limiting signal transmitters 130 shown in FIG. 1, are equipped for transmitting area limiting signals for defining an area. A communications apparatus may determine, on the basis of whether it receives area limiting signals, whether it is entering a limited area, whether it is still in the limited area, and whether it has exited from the limited area; and may maintain the state of itself on the basis of a predetermined mechanism. The detailed information may be accessed by referring to Chinese Patent Application No. 201210194518.4 filed by the same applicant, the entire contents of which are hereby incorporated by reference.

In STEP S220, if it is determined that the master node exists, then the communications apparatus carries out identity authentication with regard to the master node, and becomes a sub node. It should be noted that the identity authentication may be an authentication on the basis of whether the communications apparatus is located in the limited area too. In this case, as long as it is determined that the communications apparatus is located in the limited area (for example, the communications apparatus receives correct area limiting signals), it is possible to let the communications apparatus pass through the authentication. Of course, it is also possible to design a stricter authentication mechanism; for example, the authentication may be carried out on the basis of a password.

In STEP S230, if it is determined that the master node does not exist, the communications apparatus becomes the master node. Here the master node is in charge of the entering of a new sub node and the synchronization of shared secret keys between network nodes.

3.2 Protocol State Machine of Network Session Management

Figure 3:
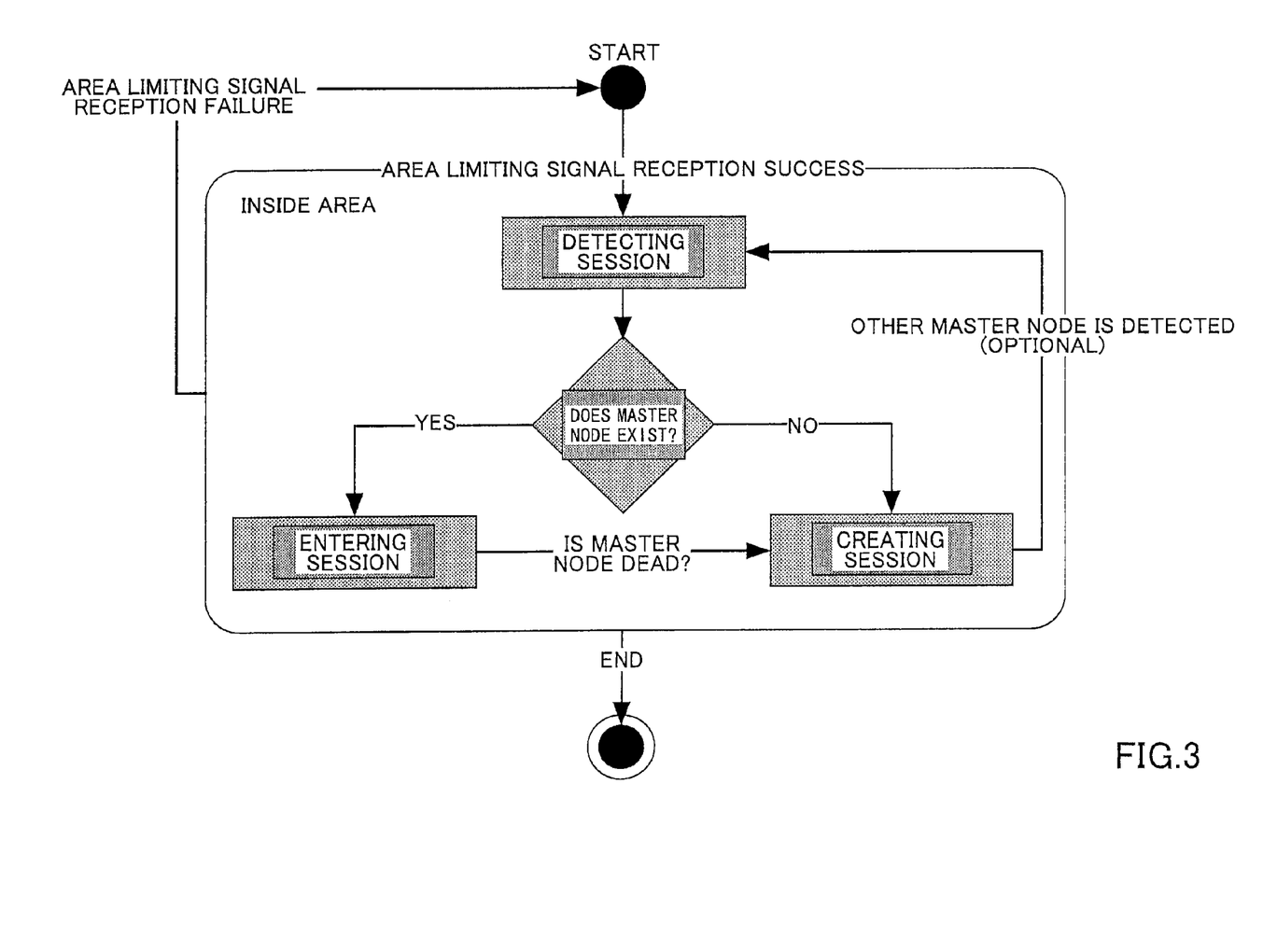
FIG. 3 illustrates a protocol state machine of network session management according to an embodiment of the present invention.

FIG. 3 illustrates a protocol state machine of network session management according to an embodiment of the present invention. Here the start of the protocol state machine is triggered by area limiting signals.

As shown in FIG. 3, a node (i.e., a communication apparatus represented by a black spot on the top) is, when turned on, in a start state.

If the node receives the area limiting signals, it means that the node enters the limited area, and the node is in a session detecting state. In the session detecting state, for example, by broadcasting a message, the node determines whether a master node exists. At this time, if it is determined that the master node exists, the master node sends back a response message after receiving the broadcasted message.

If the node determines that the master node exists, then the node enters a session entering state, and becomes a sub node; otherwise, the node enters a session creating state, and automatically becomes a logical master node.

Optionally, a sub node having entered the session may determine whether the master node still exists. If the sub node determines that the master node does not exist, the sub node may enter the session creating state on the basis of a predetermined condition, i.e., may automatically become a new master node.

Optionally, the master node may determine whether another master node exists, and may selectively reenter the session detecting state on the basis of actual circumstances.

If a node does not receive the area limiting signals in a predetermined time period due to, for example, exiting from the limited area, then the node returns to the start state.

If a node stops working due to, for example, power down, then the node enters a stop state.

In what follows, network session management in various circumstances will be described according to a network session creating process and a network session maintaining process.

3.3 Creation of Network Session

Figure 4:
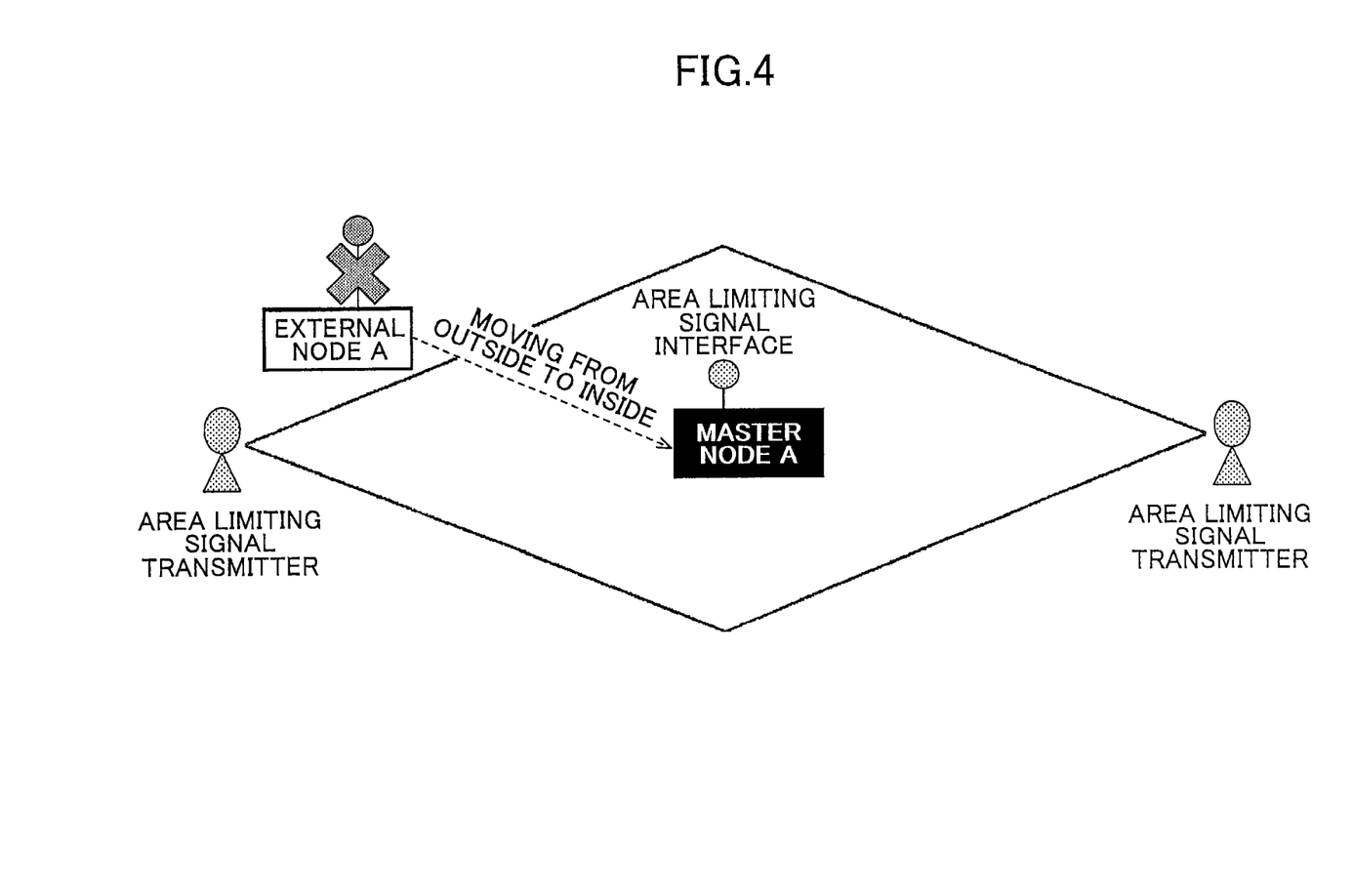
FIG. 4 illustrates an example of a node having first entered a limited area becoming a master node.

FIG. 4 illustrates an example of a node first having entered a limited area becoming a master node.

As shown in FIG. 4, when a node A is out of the limited area, the node A cannot successfully receive area signals (i.e., area limiting signals) transmitted by area limiting signal transmitters. As a result, the node A cannot create a network session, and cannot enter a network session either. After the node A enters the limited area, first the node A may successfully receive the area limiting signals transmitted by the area limiting signal transmitters so as to trigger the start of a protocol state machine of network session management.

After the node A enters the initial state of session detection, the node A determines whether a master node exists in the limited area, or determines whether an adjacent node exists in the limited area.

As shown in FIG. 4, the node A is a unique one having entered the limited area; as a result, the node A cannot detect a master node or an adjacent node in the limited area. Therefore, the node A enters a session creating state, and automatically becomes a master node.

3.4 Entering of New Sub node

Figure 5:
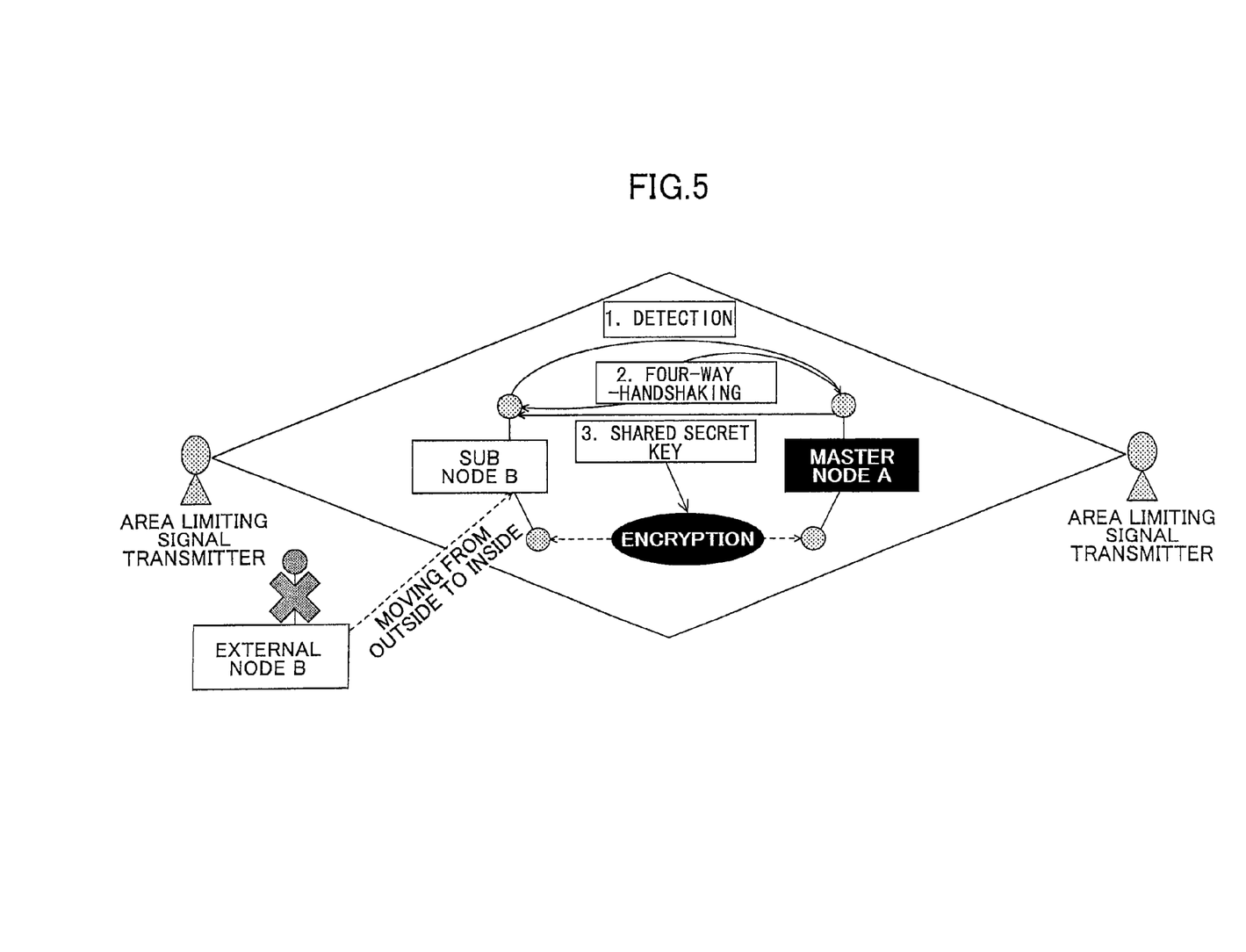
FIG. 5 illustrates an example of an operation of a first new sub node entering an area-limited self-organized network.

FIG. 5 illustrates an example of an operation of a first new sub node entering an area-limited self-organized network.

As shown in FIG. 5, after a node B enters a limited area, first the node B determines whether a master node exists in the limited area. By determining, based on a broadcasted message, whether an adjacent node exists, it is possible to determine whether the master node exists.

After a master node A receives a detection signal from the node B, the node A sends a response message to the node B, and carries out identity authentication with regard to the node B at the same time. Here it should be noted that there is no limit to the identity authentication. As long as a new node having entered the limited area proves that it is located in the limited area, the new node may pass through the identity authentication. For example, after successfully accomplishing the identity authentication by a 4-way-handshake process, the node B becomes a sub node in the current network session.

After the node B passes through the identity authentication, the master node A may send a shared secret key of the current network session to the node B (hereinafter, called a "sub node B"), and in a case in which other sub nodes except the sub node B exist, it is possible to inform all of the other sub nodes of the information related to this new sub node (i.e., the sub node B). Subsequently, it is possible to carry out data transfer by utilizing encryption based on the shared secret key between the master node A and the sub node B.

According to an embodiment, a master node may allocate a priority to each sub node, and the priority is used for indicating a priority level of the corresponding sub node becoming a new master node. For example, the priorities may be determined on the basis of order of the sub nodes entering the limited area. That is to say, a sub node having first entered the limited area has a highest priority, a sub node having second entered the limited area has a second-highest priority, and so on. For example, a priority may be simply expressed as an order number (also called a "rank") of entering a limited area. In other words, the order number of a sub node having first entered the limited area may be 1 (i.e., rank=1), the order number of a sub node having second entered the limited area may be 2 (i.e., rank=2), and so on. Here it should be noted that the master node may allocate a highest priority to itself, for example, rank=0. However, the present invention is not limited to this kind of method of allocating priorities based on order of sub nodes entering a limited area. That is to say, the above described method of allocating priorities is just an example. It is also possible to allocate priorities by taking into account, for example, device performance, support protocols, and so on. The allocated priorities serve as a reference index for selecting a candidate master node as will be described later.

Figure 6:
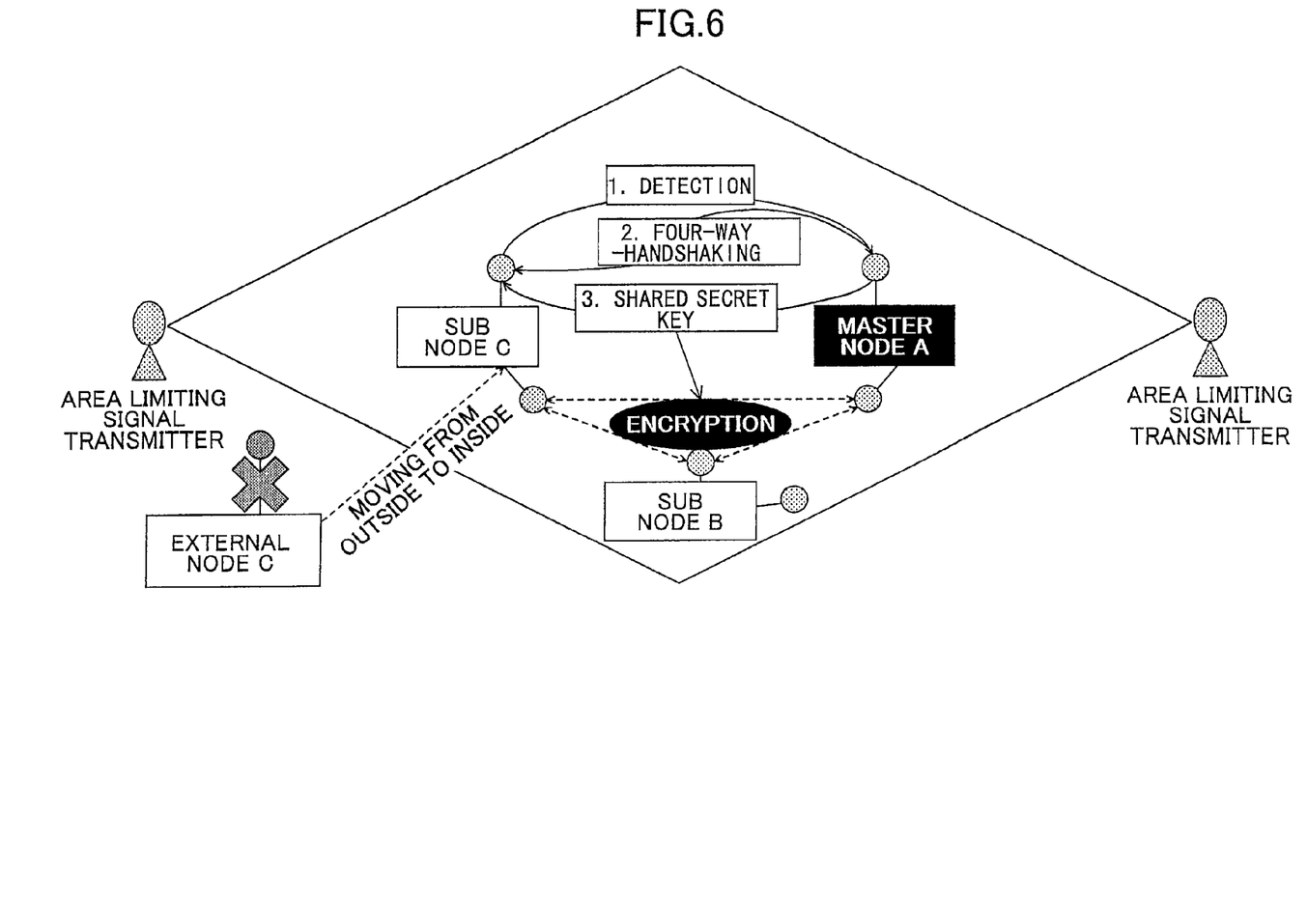
FIG. 6 illustrates an example of an operation of another new sub node entering an area-limited self-organized network.

FIG. 6 illustrates an example of an operation of another new sub node entering an area-limited self-organized network.

As shown in FIG. 6, after a node C enters a limited area, and accomplishes an identity authentication being the same as that when the node B enters, the node C serves as a sub node C entering the current network session.

According to an embodiment, in a case in which priorities are assigned on the basis of order of sub nodes entering a limited area, since the sub node C enters the limited area after the sub node B does, the priority assigned to the sub node C is less than that assigned to the sub node B.

In addition, according to an embodiment, a master node A may inform other session members (for example, in the example shown in FIG. 6, the session member is the sub node B) that the new sub node C has entered the limited area, by performing an event notification.

After the above described network session creation and entering process, it is possible to perform data transfer between any two of the master node A and sub nodes B and C in the created area-limited self-organized network by utilizing encryption based on a shared secret key.

According to an embodiment, the master node A is only in charge of the entering of a new sub node and the synchronization of session states of network nodes, and is not involved in data transfer between the network nodes. As a result, the master node A may carry out the network session management more rapidly and more effectively.

3.5 Sub Node Exiting from Session

According to an embodiment of the present invention, when a sub node disappears, and a master node detects this event, the master node changes a shared secret key, reports that the sub node has disappeared, and sends the changed shared secret key to other sub nodes. Here it should be noted that the disappearance of a sub node may be caused by, for example, exiting from a limited area, shutdown, malfunction, etc. Furthermore, in this specification, "disappearance of a sub node", "death of a sub node", "turnoff of a sub node", and "a sub node exiting from a session" have the same meaning, and any one of them may be used.

An example of detecting the disappearance of a sub node by a master node may be periodically and automatically sending by the sub node to the master node a predetermined signal indicating that the sub node itself still exists. If the master node does not receive the predetermined signal sent from the sub node in a predetermined time period, then the sub node may be regarded as having disappeared.

Another example of detecting the disappearance of a sub node by a master node may be periodically polling the state of the sub node by the master node so as to determine whether the sub node still exists. After the sub node receives a state polling request sent by the master node, the sub node sends back a response message informing the master node of its state.

Figure 7:
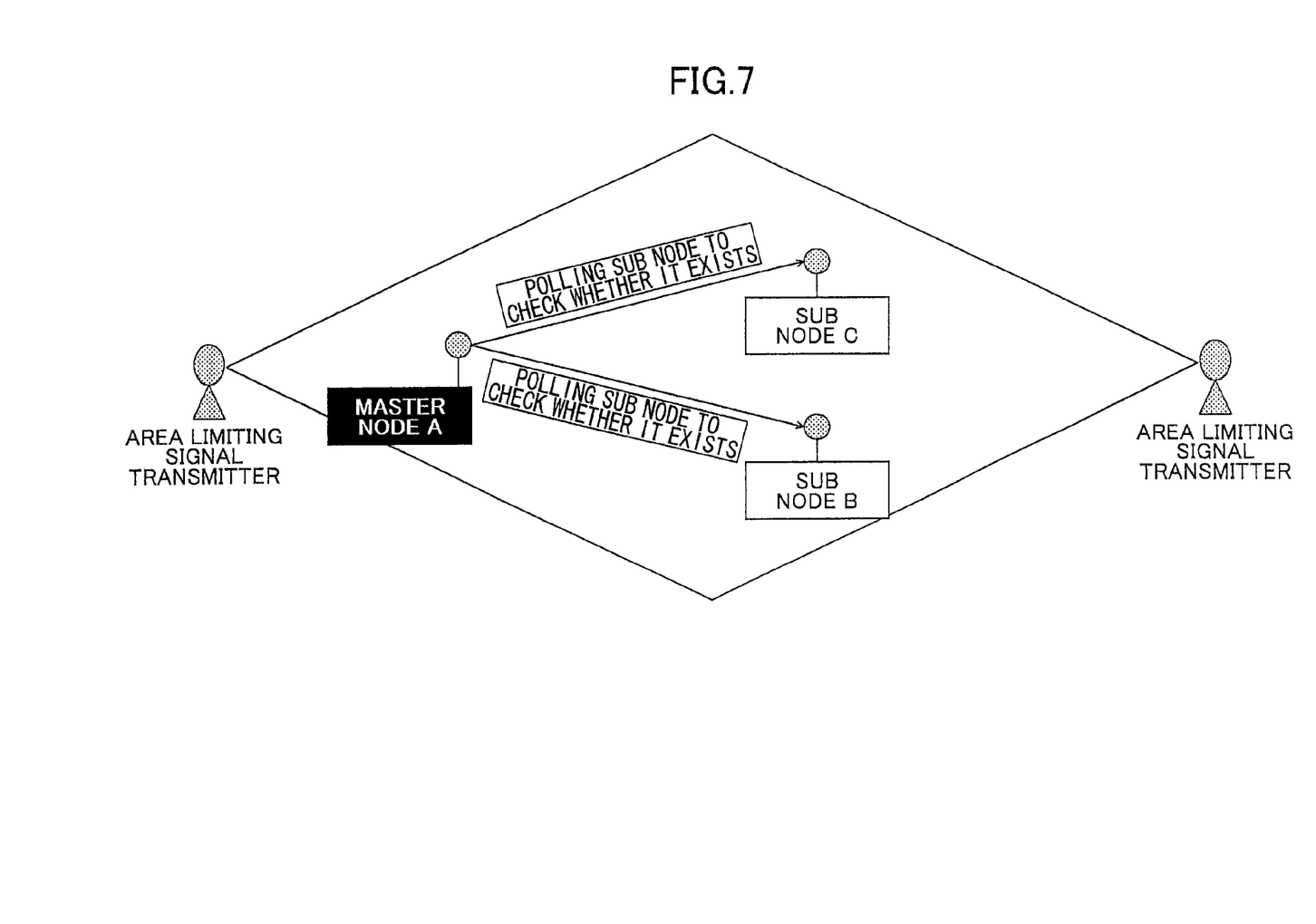
FIG. 7 illustrates an example of a master node polling states of sub nodes.

FIG. 7 illustrates an example of a master node polling states of sub nodes.

As shown in FIG. 7, a node A serving as a master node may periodically poll the states of session member nodes (sub nodes B and C) so as to determine whether the sub nodes B and C still exist.

After the sub nodes B and C receive state polling requests sent by the master node A, they send back response messages informing the master node A of their states.

If the master node A does not receive the response message sent by the sub node B in a predetermined time period, then the master node A regards the sub node B as a node turned off. After the master node A changes a shared secret key of a network session, the master node A synchronizes a session state with respect to all of other sub nodes. Synchronizing a session state may include, for example, sending the changed shared secret key of the network session to all of the other sub nodes, and informing all of the other sub nodes of a message indicating that the sub node B has disappeared. This may be achieved by, for example, sending a newest network node list to all of the other sub nodes. As an example, the network node list may store (comprise) at least one network node together with its ID, its network address, its type (a master node or a sub node), and its priority. Here it should be noted that this kind of network node list is just an example, and those people skilled in the art may design the form of the network node list and the items of the network node list according to actual needs.

3.6 Master Node Exiting from Session

According to an embodiment, when a master node disappears, a sub node having a highest priority automatically becomes a new master node, and informs other sub nodes that the master node has changed, i.e., the session formed by the master node has changed.

A sub node may automatically monitor (check) whether a master exists. According to an embodiment, in a case in which a master node periodically polls the states of sub nodes, if a sub node does not receive a polling request sent by the master node in a predetermined time period, then the sub node may automatically send a request for the master node to perform the polling. If the sub node does not successfully receive a response from the master node, then the sub node may regard the master node as having disappeared. According to another embodiment, a sub node may periodically poll the state of a master node. If the sub node does not receive a response from the master node in a predetermined time period, then the sub node may regard the master node as having disappeared.

After it is determined that the master node has disappeared, a sub node having a highest priority automatically becomes a new master node, informs other sub nodes in a current session that the master node has changed, and synchronizes a session state with respect to all of the other sub nodes. As described above, synchronizing a session state may include changing a shared secret key, informing all of other sub nodes of the changed shared secret key, and sending a newest network node list to all of the other sub nodes.

As for detection of the priorities of sub node themselves, as an example, it may be achieved by sending a sub node priority list to the respective sub nodes by a master node periodically, when a new sub node enters, or when a sub node exits. As another example, it may be achieved by broadcasting, from each sub node, the priority of the corresponding sub node to the other sub nodes. After each sub node receives the priorities of the other sub nodes, the corresponding sub node compares the priority of itself with the priorities of the other sub nodes. If a sub node does not find another sub node whose priority is higher than that of itself, then this sub node may clearly know that it is a sub node having a highest priority.

Figure 8:
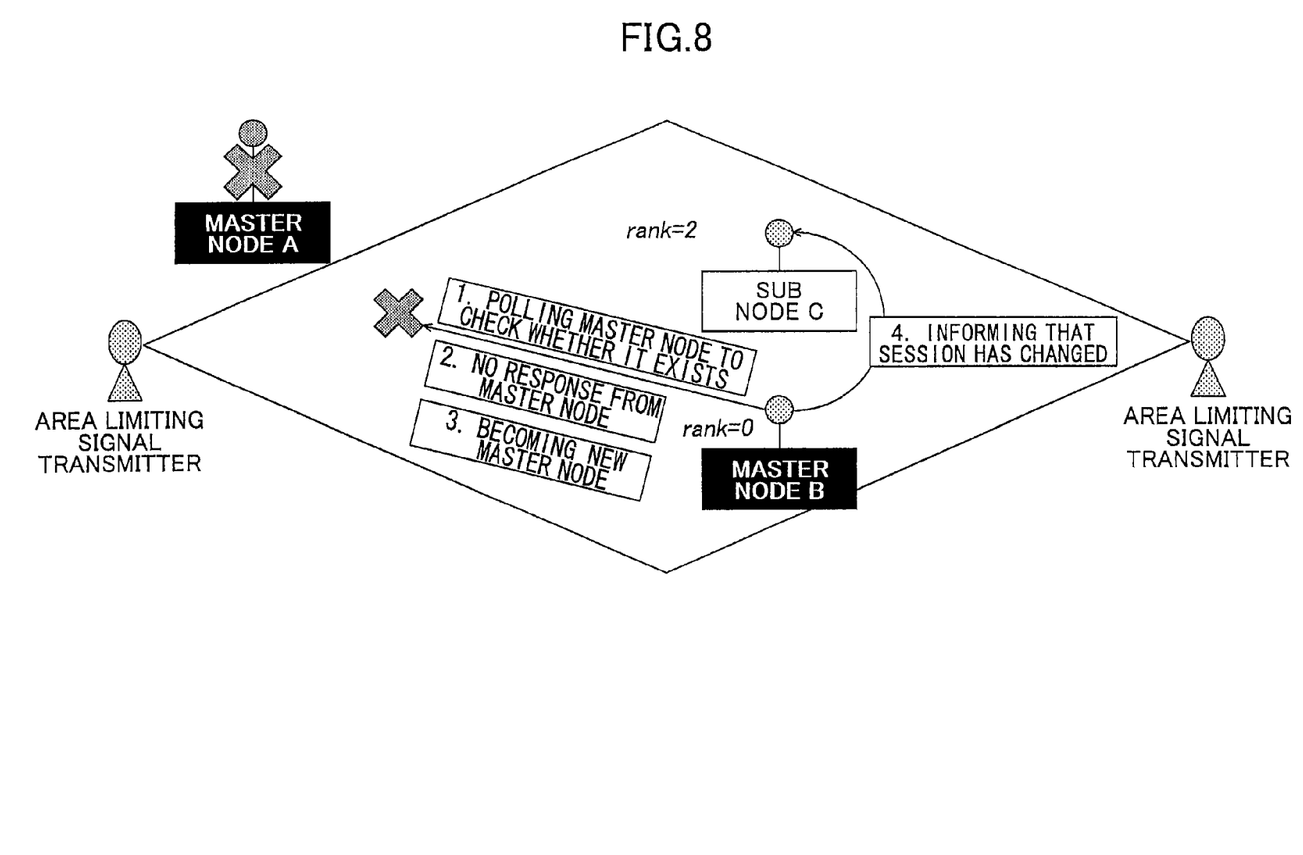
FIG. 8 illustrates an exemplary process of a sub node becoming a master node automatically.

FIG. 8 illustrates an exemplary process of a sub node becoming a master node automatically.

As shown in FIG. 8, a master node A leaves from a limited area, and a sub node B, i.e., a sub node having a highest priority does not receive a polling request from the master node A in a predetermined time period. In STEP 1, the sub node B polls the master node A so as to determine whether the master node A still exists. In STEP 2, the sub node B does not receive a response from the master node A. In STEP 3, the sub node B automatically becomes a new master node. In an example, the sub node B may change its rank from 1 to 0, i.e., change its rank to a default rank of a master node. In STEP 4, the sub node B informs other sub nodes (in the example shown in FIG. 8, the other sub node is a sub node C) of a changed session state, for example, a changed network session secret key, a current newest network node list, etc.

According to the above exemplary process, it is possible to solve a problem of how to decide upon a new master node after an existing master node disappears in an area-limited self-organized wireless network.

3.7 Solution of Master Node Collision

Sometimes there is an extreme case, for example, a case in which more than one master node may temporarily exist in a system due to network congestion, etc. In general, when a sub node having a highest priority polls a master node so as to determine whether the master node still exists, and does not receive a response from the master node in a predetermined time period, the sub node regards the master node as having disappeared, and automatically becomes a new master node. However, perhaps the reason why the sub node does not receive the response from the master node in the predetermined time period is network congestion. That is to say, after the network congestion disappears, i.e., after the network returns to normal, a case in which two master node exist at the same time occurs.

Each master node may periodically broadcast a message indicating that the corresponding master node itself is a master node. In this way, each master node may realize that other master nodes exist. Alternatively, each master node may broadcast a message indicating that the corresponding master node itself is a master node, in a predetermined time period after every change of a master node (for example, every time a sub node having a highest priority automatically becomes a new master node because a master node exits).

According to an embodiment, when a master node broadcasts a message stating that it is a master node, at the same time, information indicating the priority of the master node (for example, age information indicating a time period after entering a limited area) may be included. Alternatively, according to another embodiment, after a master node realizes that other master nodes exist in a limited area, the master node may send a message indicating the priority of itself (for example, age information indicating a time period after entering the limited area) to the other master nodes.

According to an embodiment, after a master node A knows the priorities of other master nodes, the master node A may compare the priority of itself with the priorities of the other master nodes. If the master node A finds that the priority of a master node (for example, a master node B) is higher than that of itself, and is highest among the priorities of the other master nodes, then the master node A releases (dissolves) sub nodes of itself, and lets itself and the sub nodes of itself enter the session of the master node B as a new sub node entering the limited area does.

According to another embodiment, a master node A periodically broadcasts information indicating that it is a master node and indicating the priority of itself. When a master node B realizes that the priority of the master node A is highest, i.e., realizes that the master node A is one having a highest priority, the master node B automatically becomes a sub node, and performs an operation of entering the session of the master node A. Similarly, when a sub node C realizes that the priority of the master node A is higher than that of the master node B to which the sub node C presently belongs, the sub node C automatically becomes a new sub node, and performs an operation of entering the session of the master node A.

Figure 9:
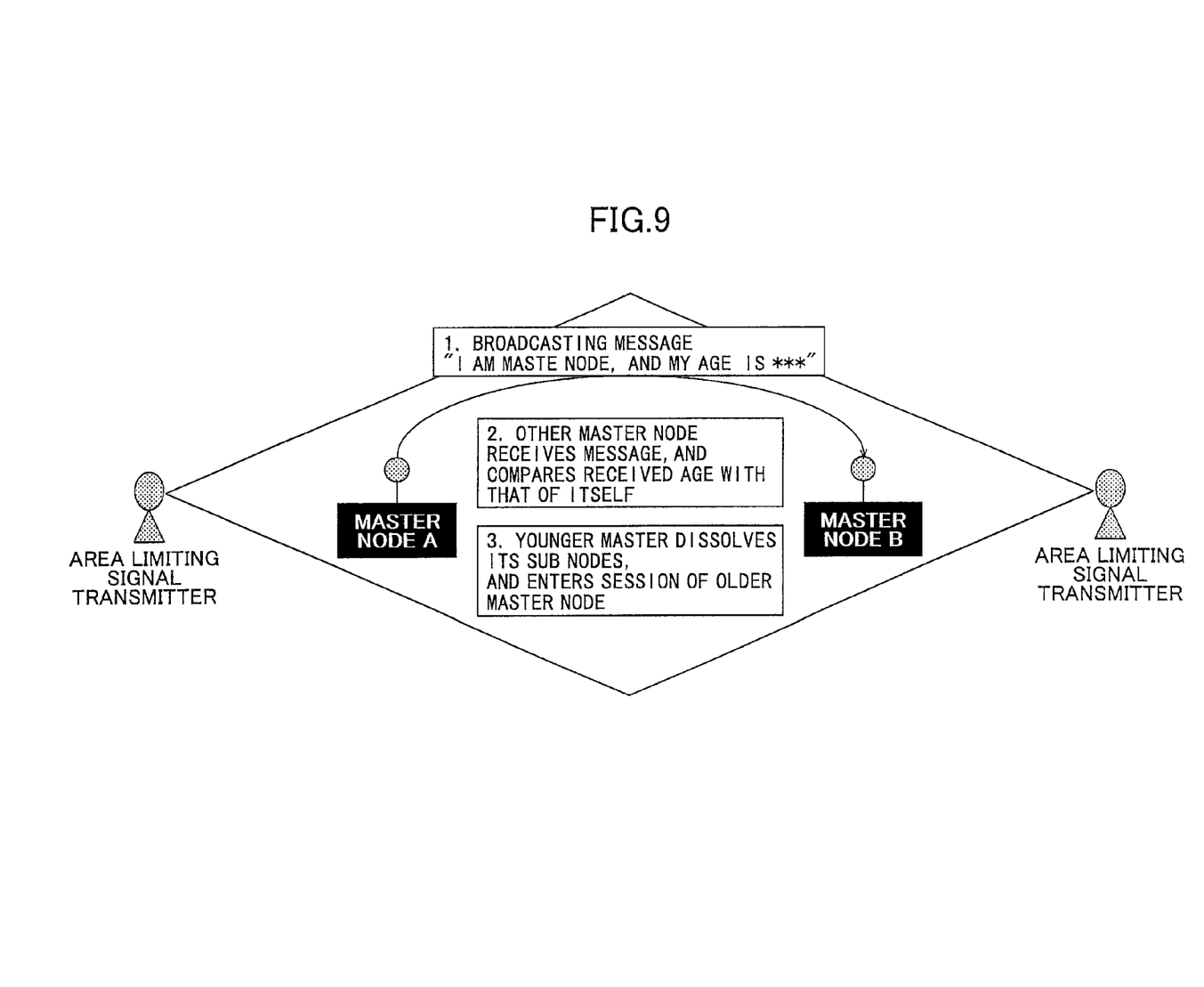
FIG. 9 illustrates an exemplary process of solving a master node collision problem according to an embodiment of the present invention.

FIG. 9 illustrates an exemplary process of solving a master node collision problem according to an embodiment of the present invention.

As shown in FIG. 9, for example, due to some reasons, a master node A and a master node B exist in a limited area at the same time. In STEP 1, the master node A broadcasts a message indicating that it is a master node and indicating its age (i.e., a time period after entering the limited area). In STEP 2, the master node B receives the message sent from the master node A, and compares the age of itself with the age of the master node A. In STEP 3, if the master node B finds that the age of the master node A is older than that of itself, then the master node B releases sub nodes of itself, and performs an operation entering the session of the master node A.

As a result, it is possible to solve the master node collision problem and to ensure the network session coincidence.

4. Communications Apparatus

Figure 10:
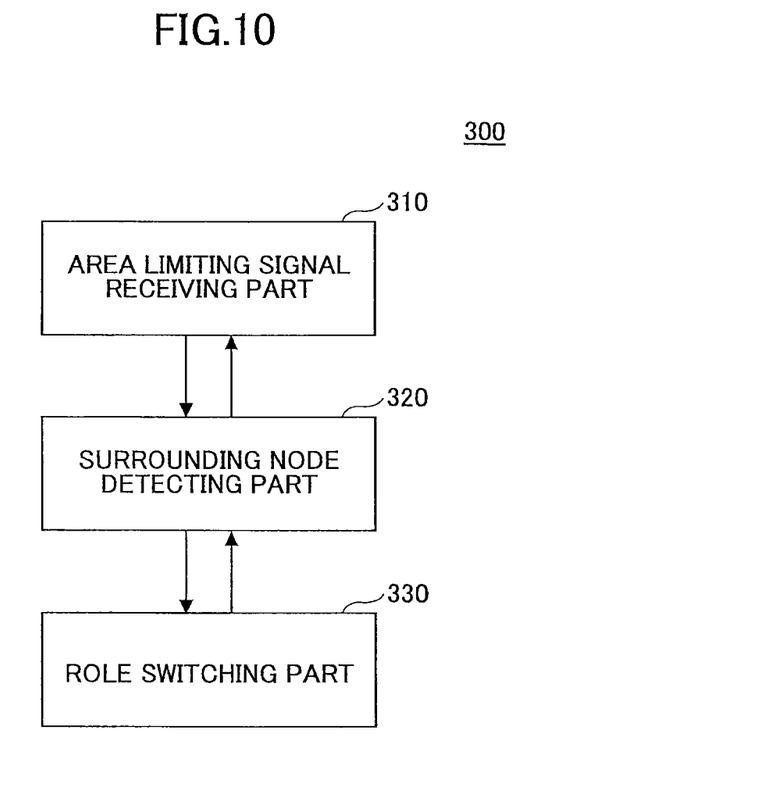
FIG. 10 illustrates a functional block diagram of a communications apparatus according to an embodiment of the present invention.

In what follows, a communications apparatus able to be involved in network sessions of an area-limited self-organized network, according to an embodiment of the present invention is described by referring to FIG. 10.

FIG. 10 illustrates a functional block diagram of a communications apparatus according to an embodiment of the present invention.

As shown in FIG. 10, a communications apparatus 300 may comprise an area limiting signal receiving part 310, a surrounding node detecting part 320, and a role switching part 330.

The area limiting signal receiving part 310 is configured to receive area limiting signals. The structure and configuration of the area limiting signal receiving part 310 vary according to different area limiting signal transmitters used in an area-limited self-organized network. For example, if an area signal transmitter transmits an infrared signal, then the area limiting signal receiving part 310 may receive the infrared signal by using an infrared signal receiver. If the area signal transmitter transmits an area signal in a manner of IR, NFC, ultrasonic waves, microwaves, etc., then the area limiting signal receiving part 310 should adopt a component able to receive the area signal transmitted in a manner of IR, NFC, ultrasonic waves, microwaves, etc.

The surrounding node detecting part 320 is configured to, when the communications apparatus which is entering the limited area receives the area limiting signals, determine whether a master node exists in the limited area.

The role switching part 330 is configured to, if it is determined that the master node exists, carry out identity authentication with regard to the master node based on the area limiting signals and let the communications apparatus be a sub node; and if it is determined that the master node does not exist, let the communications apparatus be the master node.

Here the master node is in charge of the entering of a new sub node and the synchronization of shared secret keys between any two of network nodes.

Here it is should be noted that the above described functional configuration of the communications apparatus is just an example. The communications apparatus may also comprise other parts. For example, the communications apparatus may comprise a priority maintaining part configured to maintain the priority of the communications apparatus itself.

According to an embodiment, if the communications apparatus is a sub node, then it has a priority assigned by the master node, indicating a priority level of becoming a new master node. Furthermore, the communications apparatus serving as a sub node periodically detects the state of the master node. If the communications apparatus serving as a sub node does not detect the existence of the master node in a predetermined time period, and the priority of this communication apparatus is higher than those of all of other sub nodes, then this communications apparatus automatically becomes a new master node, and informs all of the current session members that the master node has changed.

According to another embodiment, if the communications apparatus is a master node, then it periodically detects the states of respective sub nodes. If the communication apparatus serving as a master node does not detect the existence of a sub node in a predetermined time period, then this communications apparatus regards the sub node as having disappeared, changes a shared secret key, and informs all of the other sub nodes of a message indicating that the sub node has disappeared as well as the new (changed) shared secret key.

In addition, the communications apparatus may also comprise a network node list maintaining part configured to maintain a network node list of the current area-limited self-organized network.

According to another embodiment, the communications apparatus may also comprise a network session state synchronizing part configured to, when the communications apparatus serves as a master node, synchronize network session states by, for example, informing sub nodes of a newest shared secret key and a newest network node list.

5. Area-Limited Wireless Communications System

According to an embodiment of the present invention, an area-limited wireless communications system is provided. It may comprise area limiting signal transmitting apparatuses configured to transmit area limiting signals for limiting an area; and one or more wireless communications apparatuses dynamically located in the limited area. Here one of the wireless communications apparatuses serves as a master node, and the others serve as sub nodes. Furthermore, the master node is in charge of the entering of a new sub node and the synchronization of the shared secret keys between any two of network nodes.

In the wireless communications system, if the master node disappears, then one of the sub nodes automatically becomes a new master node. Here it should be noted that in a case where only one wireless communications apparatus exists, this wireless communications apparatus becomes a new master node. After that, if a new wireless communications apparatus enters, then this new wireless communications apparatus becomes a sub node.

In the wireless communications system, a sub node has a priority assigned by the master node, indicating a priority level of becoming a new master node. A communications apparatus serving as a sub node periodically detects the state of the master node. If this communications apparatus serving as a sub node does not detect the existence of the master node in a predetermined time period, and this communications apparatus has a highest priority compared to the other sub nodes, then this communications apparatus automatically becomes a new master node, and informs the other sub nodes that the master node has changed.

In the wireless communications system, the master node periodically detects the states of the respective sub nodes. If the master node does not detect the existence of a sub node, the master node regards this sub node as having disappeared, changes a shared secret key, and informs the other sub nodes by a message indicating that this sub node has disappeared as well as providing a new (changed) shared secret key.

6. Conclusion

The area-limited self-organized network management method, the communications apparatus, and the area-limited wireless communications system according to the embodiments of the present invention are described above. By utilizing the area-limited self-organized network management method, the communications apparatus, and the area-limited wireless communications system, it is possible to ensure the synchronization of network session states. Furthermore, since there is no need to perform a manual operation, the complexity of user operation is decreased.

In the above description, it is mentioned that the priorities of sub nodes are determined based on order of the sub nodes entering an area-limited self-organized network or lengths of time of the sub nodes after entering the area-limited self-organized network. However, this is just an example; that is to say, the present invention is not limited to this. It is also possible to determine the priorities of sub nodes based on the hardware performances of the sub nodes, the signal transfer rates of the sub nodes, the degrees of idle of the sub nodes, etc.

In the above description, it is mentioned that when a new sub node enters, or an existing sub node exits, the master node itself directly changes a shared secret key, and synchronizes the network session states. However, alternatively, the master node may choose one sub node from the sub nodes, for example, a sub node being relatively idle to serve as a proxy node, and let the proxy node inform the other sub nodes that the network session state has changed and the secret key has updated.

Here it should be noted that the above respective embodiments are just exemplary ones, and the specific structure and operation of each of them is not used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, a personal digital assistant, a mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD-ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201210441507.1 filed on Nov. 7, 2012, the entire contents of which are hereby incorporated by reference.

What is claimed is:

1. A network management method of an area-limited self-organized wireless network, wherein, only nodes located in a limited area may communicate with each other, the nodes in the self-organized wireless network including a master node or at least one sub node, and there is only one master node in the same limited area, the network management method comprising:
   a step of, when a communications apparatus which is entering the limited area receives area limiting signals used for indicating a specific area in which network nodes are located, determining by the communications apparatus whether the master node exists in the limited area;
   a step of, if it is determined that the master node exists, carrying out identity authentication with regard to the master node based on the area limiting signals and letting the communications apparatus be a sub node by the communications apparatus; and
   a step of, if it is determined that the master node does not exist, letting the communications apparatus be the master node by the communications apparatus, wherein, the master node is in charge of entering of a new sub node and synchronization of shared secret keys between the network nodes,
   wherein when there are plural master nodes in the network, any one of the plural master nodes sends its priority indicating a priority level of being a master node to other master nodes, and if a master node finds that there is another master node whose priority is higher than that of the master node, then the master node automatically becomes a sub node.

2. The network management method according to claim 1, wherein:
   when a new sub node passes through identity authentication with regard to the master node, the master node assigns a shared secret key of a current network to the new sub node, and informs other sub nodes of information related to the new sub node.

3. The network management method according to claim 1, wherein:
   the master node detects when a sub node disappears, and in response to the sub node disappearing changes a shared secret key, and informs other sub nodes of the changed shared secret key and a message indicating that the sub node has disappeared.

4. The network management method according to claim 1, wherein:
   the master node assigns a priority to each sub node, and the priority indicates a priority level of a corresponding one of the sub nodes becoming a new master node, and
   when the master node disappears, a sub node having a highest priority automatically becomes a new master node, and informs other sub nodes that the master node has changed.

5. The network management method according to claim 1, wherein:
   each sub node automatically detects whether the master node still exists.

6. A communications apparatus comprising:
   a receiver to receive area limiting signals for limiting an area;
   a surrounding node detector configured to, when the communications apparatus which is entering the limited area receives the area limiting signals, detect whether there is a master node in the limited area; and
   a role switch configured to, if it is determined that there is the master node in the limited areas, let the communications apparatus perform identity authentication with regard to the master node based on the area limiting signals so as to become a sub node, and if it is determined that there is not the master node in the limited area, let the communications apparatus be the master node, wherein, the master node is in charge of entering of a new sub node and synchronization of shared secret keys between network nodes of a network,
   wherein when there are plural master nodes in the network, any one of the plural master nodes sends its priority indicating a priority level of being a master node to other master nodes, and if a master node finds that there is another master node whose priority is higher than that of the master node, then the master node automatically becomes a sub node.

7. The communications apparatus according to claim 6, wherein:
   when the communications apparatus becomes the sub node, the communications apparatus has a priority assigned by the master node, and the priority indicates a priority level of the communications apparatus becoming a new master node; and the communications apparatus periodically detects a state of the master node, wherein, if the communications apparatus does not detect existence of the master node in a predetermined time period, and the priority of the communications apparatus is a highest one compared to those of other sub nodes, then the communications apparatus automatically becomes a new master node, and informs the other sub nodes that the master node has changed.

8. The communications apparatus according to claim 6, wherein:
   when the communications apparatus becomes the master node, the communications apparatus periodically detects states of the respective sub nodes, wherein, if the communications apparatus does not detect existence of a sub node in a predetermined time period, then the communications apparatus regards the sub node as having disappeared, changes a shared secret key, informs other sub nodes of the changed shared secret key, and sends a message indicating that the sub node has disappeared.

9. An area-limited wireless communications system comprising:
   area limiting signal transmitting apparatuses configured to transmit area limiting signals for limiting an area; and plural wireless communications apparatuses dynamically located in the limited area, wherein:

one of the plural wireless communications apparatuses serves as a master node, and the others serve as sub nodes, wherein, the master node is in charge of entering of a new sub node and synchronization of shared secret keys between network nodes of a network, and when the master node disappears, one of the sub nodes automatically becomes a new master node, in a case where there is only one wireless communications apparatus in the area-limited wireless communications system, the wireless communications apparatus becomes the master node; after that, when a new wireless communications apparatus enters, the new wireless communications apparatus becomes a sub node, each sub node has a priority assigned by the master node, and the priority indicates a priority level of a corresponding one of the sub nodes becoming a new master node; one of the communications apparatuses serving as a sub node periodically detects a state of the master node, wherein, if said one of the sub nodes does not detect the master node in a predetermined time period, and the priority of said one of the sub nodes is higher than those of other sub nodes, then said one of the sub nodes automatically becomes a new master node, and informs the other sub nodes that the master node has changed, the master node periodically detects states of the respective sub nodes, wherein, if the master node does not detect a sub node in a predetermined time period, then the master node regards the non-detected sub node as having disappeared, changes a shared secret key, and informs other sub nodes of the changed shared secret keys and information indicating that the non-detected sub node has disappeared, and when there are plural master nodes in the network, any one of the plural master nodes sends its priority indicating a priority level of being a master node to other master nodes, and if a master node finds that there is another master node whose priority is higher than that of the master node, then the master node automatically becomes a sub node.

* * * * *